(12) United States Patent
Nair

(10) Patent No.: US 6,289,444 B1
(45) Date of Patent: Sep. 11, 2001

(54) METHOD AND APPARATUS FOR SUBROUTINE CALL-RETURN PREDICTION

(75) Inventor: Ravindra K. Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/324,180

(22) Filed: Jun. 2, 1999

(51) Int. Cl.[7] ................ G06F 9/42; G06F 9/40; G06F 9/38; G06F 9/32
(52) U.S. Cl. .......... 712/243; 712/217; 712/216; 712/239; 712/240; 712/234; 712/231
(58) Field of Search .................. 712/231, 238, 712/239, 224, 243, 234, 41, 223, 235, 242, 240, 213, 219, 217, 216; 711/118, 169, 212, 203, 204, 177; 703/2

(56) References Cited

U.S. PATENT DOCUMENTS

| 5,136,696 | 8/1992 | Beckwith et al. | 712/240 |
|---|---|---|---|
| 5,179,673 | 1/1993 | Steely, Jr. et al. | 712/239 |
| 5,193,205 | * 3/1993 | Matsuo et al. | 712/243 |
| 5,276,882 | 1/1994 | Emma et al. | 712/240 |
| 5,283,873 | 2/1994 | Steely, Jr. et al. | 712/207 |
| 5,313,634 | 5/1994 | Eickemeyer | 712/240 |
| 5,355,459 | 10/1994 | Matsuo et al. | 712/242 |
| 5,526,498 | * 6/1996 | Matsuo et al. | 712/239 |
| 5,604,877 | 2/1997 | Hoyt et al. | 712/243 |
| 5,606,682 | 2/1997 | McGarity | 711/204 |
| 5,623,614 | 4/1997 | Van Dyke et al. | 712/240 |
| 5,664,135 | 9/1997 | Schlansker et al. | 712/201 |
| 5,687,349 | 11/1997 | McGarity | 711/137 |
| 5,719,795 | 2/1998 | Menkus et al. | 703/2 |
| 5,768,576 | 6/1998 | Hoyt et al. | 712/238 |
| 5,850,543 | 12/1998 | Schiell et al. | 712/238 |

OTHER PUBLICATIONS

Kaeli et al., "Branch History Table Prediction of Moving Target Branches Due to Subroutine Returns", 1991 ACM 0–89791–394–9/91, pp. 34–41.

Yeh et al., "Increasing the Instruction Fetch Rate via Multiple Branch Prediction and a Branch Address Cache", The 7th ACM International Conference on Supercomputing, pp. 67–76, Jul. 19–23, 1993, Tokyo, Japan.

* cited by examiner

Primary Examiner—Daniel Pan
(74) Attorney, Agent, or Firm—F. Chau & Associates, LLP

(57) ABSTRACT

A method for associating subroutine calls with corresponding targets includes the step of maintaining a first table of entries. Each entry in the first table includes: a first table first address identifying an entry point address for a corresponding subroutine; and a first table second address identifying a return address of a return for the corresponding subroutine. A second table of entries is also maintained. Each entry in the second table includes: a second table first address identifying a return address of a return for a respective subroutine called by a corresponding subroutine call instruction; a second table second address identifying a target address of the return for the respective subroutine; and a second table third address identifying an entry point address for the respective subroutine. It is determined whether the second table stores an entry whose second table first address corresponds to a return address of a return for a considered subroutine. If so, a target address of the return for the considered subroutine is predicted to be the second table second address of the corresponding entry.

20 Claims, 8 Drawing Sheets

METHOD AND APPARATUS FOR SUBROUTINE CALL-RETURN PREDICTION

BACKGROUND

1. Technical Field

The present invention relates generally to computer processing systems and, in particular, to a method and apparatus for predicting the target of a subroutine return branch in a computer processing system. The present invention may be employed in the case of conventional subroutines, nested subroutines, foliated subroutines, and in the case of subroutine invocations through stubs (such as, for example, in the cases of virtual method invocation or dynamic library procedure invocation).

2. Background Description

Early microprocessors generally processed instructions one at a time. Each instruction was processed using four sequential stages: instruction fetch; instruction decode; instruction execute; and result writeback. Within such microprocessors, different dedicated logic blocks performed each different processing stage. Each logic block waited until all the preceding logic blocks completed operations before beginning its operation.

Improved computational speed has been obtained by increasing the speed with which the computer hardware operates and by introducing parallel processing in one form or another. One form of parallel processing relates to the recent introduction of microprocessors of the "superscalar" type, which can effect parallel instruction computation. Typically, superscalar microprocessors have multiple execution units (e.g., multiple integer arithmetic logic units (ALUs)) for executing instructions and, thus, have multiple "pipelines". As such, multiple machine instructions may be executed simultaneously in a superscalar microprocessor, providing obvious benefits in the overall performance of the device and its system application.

For the purposes of this discussion, latency is defined as the delay between the fetch stage of an instruction and the execution stage of the instruction. Consider an instruction which references data stored in a specified register. Such an instruction requires at least four machine cycles to complete. In the first cycle, the instruction is fetched from memory. In the second cycle, the instruction is decoded. In the third cycle, the instruction is executed and, in the fourth cycle, data is written back to the appropriate location.

To improve efficiency and reduce instruction latency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock pulse the result of each processing stage is passed to the subsequent processing stage. Microprocessors that use the technique of overlapping the fetch, decode, execute, and writeback stages are known as "pipelined" microprocessors. In principle, a pipelined microprocessor can complete the execution of one instruction per machine cycle when a known sequence of instructions is being executed. Thus, it is evident that the effects of the latency time are reduced in pipelined microprocessors by initiating the processing of a second instruction before the actual execution of the first instruction is completed.

In general, instruction flow in a microprocessor requires that the instructions are fetched and decoded from sequential locations in a memory. Unfortunately, computer programs also include branch instructions. A branch instruction is an instruction that causes a disruption in this flow, e.g., a taken branch causes decoding to be discontinued along the sequential path, and resumed at a new location in memory. The new location in memory may be referred to as a target address of the branch. Such an interruption in pipelined instruction flow results in a substantial degradation in pipeline performance.

There are various types of branch instructions. One type of branch instruction is known as an unconditional branch in that it unconditionally transfers control from the branch instruction to the target instruction. That is, at the time that the branch instruction is decoded, it is known that the transfer of control to the target instruction will take place. Examples of unconditional branches include subroutine CALL/RETURN and GOTO. In terms of performance, a more costly branch instruction is known as a conditional branch. This instruction specifies that control is to be transferred to the target instruction only if some condition, as determined by the outcome of a previous instruction, is met. Examples of conditional branch constructs include the DO LOOP and the IF/THEN/ELSE.

Subroutine linkage typically involves a call to a subroutine and a return from the subroutine back to the instruction immediately following the call. Usually, the call is done through a branch instruction which saves the address to return to in a register, while the return is done by branching indirectly through the contents of this register. For example, in the PowerPC, the branch-and-link instruction (BL) is used for the call. This instruction saves the address of the immediately following instruction in a special register referred to as the link register. The branch-using-link-register (BCLR) is used to return from the subroutine through the contents of the link register. In the System 390, the corresponding instructions are BAL or BALR for the call, and BR for the return. In this case, the link information is kept in a general purpose register that is specified with the instruction, instead of in the link register.

Subroutines pose a problem for heavily pipelined computers (those with many stages in the pipeline). Although the instruction which calls a subroutine will contain enough information to determine which is the next instruction to enter the pipeline (i.e., the first instruction in the called subroutine), the return instruction in the subroutine will not contain such information. Instead, a return instruction must pass through all of the stages of the pipeline before the return address will be known from the return instruction. If the computer waited for the return instruction to pass through the pipeline before entering another instruction, there would then be a "bubble" in the pipeline behind the return instruction in which there would be no instructions, thereby lowering the performance of the computer.

To help alleviate the penalty due to the latency of pipelines, many pipelined microprocessors use branch prediction mechanisms that predict the existence and the outcome (i.e., taken or not taken) of branch instructions within an instruction stream. The instruction fetch unit uses the branch predictions to fetch subsequent instructions.

When a branch prediction mechanism predicts the outcome of a branch instruction and the microprocessor executes subsequent instructions along the predicted path, the microprocessor is said to have "speculatively executed" along the predicted instruction path. During speculative execution the microprocessor is performing useful processing if the branch instruction was predicted correctly.

However, if the branch prediction mechanism mispredicted the branch instruction, the microprocessor is executing instructions down the wrong path and therefore accomplishes nothing. When the microprocessor eventually detects the mispredicted branch, the microprocessor must flush the instructions that were speculatively fetched from the instruction pipeline and restart execution at the correct address. The effect of the above described non-sequential operation, and of the resultant flushing of the pipeline, is exacerbated in the case of superscalar pipelined microprocessors. For example, if a branch or other interruption in the sequential instruction flow of the microprocessor occurs, the number of lost pipeline slots, or lost execution opportunities, is multiplied by the number of parallel execution units (i.e., parallel pipelines). The performance degradation due to branches and corresponding non-sequential program execution is therefore amplified in superscalar pipelined microprocessors.

Prediction of subroutine return branches is usually more difficult than the prediction of most other branches, because the same branch instruction could have different targets corresponding to the different points of subroutine invocation. The instruction used for calls and returns are not unique—there are different instructions that are used in different instances to perform these functions. Moreover, these instructions may be used for purposes other than subroutine calls and returns. This makes it difficult to use simple stack-based schemes for predicting returns.

Prediction techniques have included the use of Branch History Tables (BHTs), Branch Target Buffers (BTBs), and return address stacks. In its simplest form, a BHT maintains the outcomes of previously executed branches. The table is accessed by the instruction prefetch unit and decides whether prefetching should be redirected or not. The table is searched for a valid entry, just as a cache is searched. The table is typically set-associative, as is the case with many cache organizations. An entry is only added to the table when a taken branch is executed by the processor. On each BHT hit, the historical information in that entry is used by the prediction algorithm. The algorithm redirects prefetching for a taken prediction, or continues with the next sequential instruction for a not-taken prediction. Some implementations invalidate the entry when the branch changes to not taken. In this case, a BHT miss will occur subsequently, and next-sequential prefetching will ensure. If the prediction is wrong, the processor must be equipped with a back-out strategy to restore the necessary state.

Thus, stated generally, a BHT stores past actions and targets of branches, and predicts that future behavior will repeat. However, while past action is a good indicator of future action, the subroutine CALL/RETURN paradigm makes correct prediction of the branch target difficult.

Conventional BTBs are cache-like buffers that are used in the fetch units of microprocessors to store an identifier of a previously performed branch instruction as a tag, along with the target address (i.e., the address to which the branch points in its predicted state) and an indication of the branch's history. Upon subsequent fetches of the branch, the target address is used (depending on the branch history) as the next address to fetch in the pipeline. Upon execution of the branch instruction itself, the target address is compared against the actual next instruction address determined by the execution unit to verify whether the speculative execution was valid. However, the use of BTBs is not without deficiency. For example, as with the BHT, a BTB indexed using the address of the branch is able to provide the address of the target only when the branch is decoded in the instruction stream.

Return address stacks store the next sequential instruction address to be executed after return from the subroutine (i.e., the next instruction in the calling program after a subroutine), in similar fashion as the actual return address is stored in a logical stack upon execution of the call. The instruction address stored in the return address stack is used to speculatively fetch the next instruction after the return. Upon execution of the return, this value from the return address stack is compared against the actual return address popped from the logical stack to verify whether the speculative pipeline operation was valid.

IBM Technical Disclosure Bulletin Vol. 30, No. 11, April 1988, pp. 221–225, "Subroutine Call/Return Stack" by Webb describes a pair of stacks for saving subroutine addresses. This mechanism also uses a branch history table with an extra bit in each entry to identify Return instructions. A Return is identified when the branch prediction is verified for the Return. If the stack prediction was correct, a potential return instruction must have functioned as a Return. Consequently, the first time a particular Return is encountered, it is not handled as a Return. On subsequent executions of the instruction, the branch history table identifies the instruction as a Return and it is predicted using the stack. This mechanism requires two stacks, which are used in associative searches to find the prediction of a Return and to identify Returns.

Unfortunately, a problem with the stack mechanism is that the instructions used for calls and returns may be used for other purposes also. For example, the return instruction in the PowerPC, branch-using-register (br), is also used for implementing the C-language "switch" statement, which determines the target of a branch based on a variable which could take on one of several values unknown at compile time. The occurrence of such a branch could make the stack get out-of-sync and reduce the effectiveness of the prediction. The problem is even worse when a given instruction in the instruction set is used to implement both a call as well as a return as in some System/390 implementations.

Thus, it would be desirable and highly advantageous to have a method and apparatus for accurately predicting the target of a subroutine return branch. It would also be desirable and highly advantageous to have a method and apparatus for prefetching and processing target instructions before execution of the return.

SUMMARY OF THE INVENTION

The present invention is directed to a method and apparatus for predicting the target of a subroutine return branch.

According to a first aspect of the present invention, a method for associating subroutine return branches with corresponding targets includes the step of storing in a first table a plurality of entries for at least one subroutine that has been executed. Each entry in the first table includes: a first table first address identifying an entry point address for a corresponding subroutine; and a first table second address identifying a return address of a return for the corresponding subroutine. Upon generation of a target address for a subroutine call instruction associated with a subroutine, in a second table, a new entry is built for the subroutine call instruction. An in pointer of the second table is updated to point to the new entry. Each entry in the second table includes: a second table first address identifying a return address of a return for a respective subroutine called by a corresponding subroutine call instruction; a second table second address identifying a target address of the return for the respective subroutine; and a second table third address identifying an entry point address for the respective subroutine. The building step includes the steps of: setting a second table second address of the new entry to an address corresponding to a sum of the subroutine call instruction and one instruction; and setting a second table third address of the new entry to the target address for the subroutine call instruction. It is then determined whether the first table stores an entry whose first table first address matches the target address for the subroutine call instruction. If so, a second table first address of the new entry is set to the first table second address of the matching entry.

According to a second aspect of the present invention, the method further includes the step of determining whether the second table stores an entry whose second table first address corresponds to a return address for the associated subroutine. If so, a target address of the return for the associated subroutine is predicted to be the second table second address of the corresponding entry.

According to a third aspect of the present invention, the method further includes the steps of, upon generation of the target address of the return for the associated subroutine, determining whether the target address of the return for the associated subroutine is equal to the second table second address of the corresponding entry and whether the second table first address of the corresponding entry is unspecified. If so, in the first table, a new entry is built for the subroutine. The building step includes the steps of: setting a first table first address of the new entry in the first table to the second table third address of the corresponding entry; and setting a first table second address of the new entry in the first table to the return address of the associated subroutine.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and apparatus for predicting the target of a subroutine return branch. The present invention provides a high success rate for such predictions, and allows for prefetching and processing of target instructions before execution of the return. Moreover, the present invention may be employed in the case of conventional subroutines, nested subroutines, foliated subroutines, and in the case of subroutine invocations through stubs (such as, for example, in the cases of virtual method invocation or dynamic library procedure invocation).

To facilitate a clear understanding of the present invention, definitions of terms employed herein will now be given. A "target" address of a subroutine call instruction and an "entry point" address for a subroutine both correspond to an address of the subroutine at which processing of the subroutine begins. A "return" address for a subroutine corresponds to an address of the subroutine from which a return is made to the calling program. A "target address" of a return for the subroutine corresponds to an address in a calling program to which a return would take place. In general, the target address of a return corresponds to the address in the calling program immediately following the subroutine call instruction.

The present invention may employ what is hereinafter referred to as a "Superblock Target Buffer" (STB), which is described in the patent application Ser. No. 09/324,292 (IBM Docket No. YO999-012) entitled, "Method and Apparatus for Prefetching Superblocks in a Computer Processing System", filed concurrently herewith, the disclosure of which is incorporated herein by reference. Accordingly, definitions of terms corresponding thereto will now be given. A superblock is a set of instructions in consecutive address locations terminated by a branch that is known to have been taken. Thus, branches that are never taken in the course of an execution cannot terminate a superblock. A superblock is formed whenever the target of a taken branch is not already the start of an existing superblock. A superblock is associated with a starting address, a run-length, a predictor, and a target address, as described below.

Figure 1:
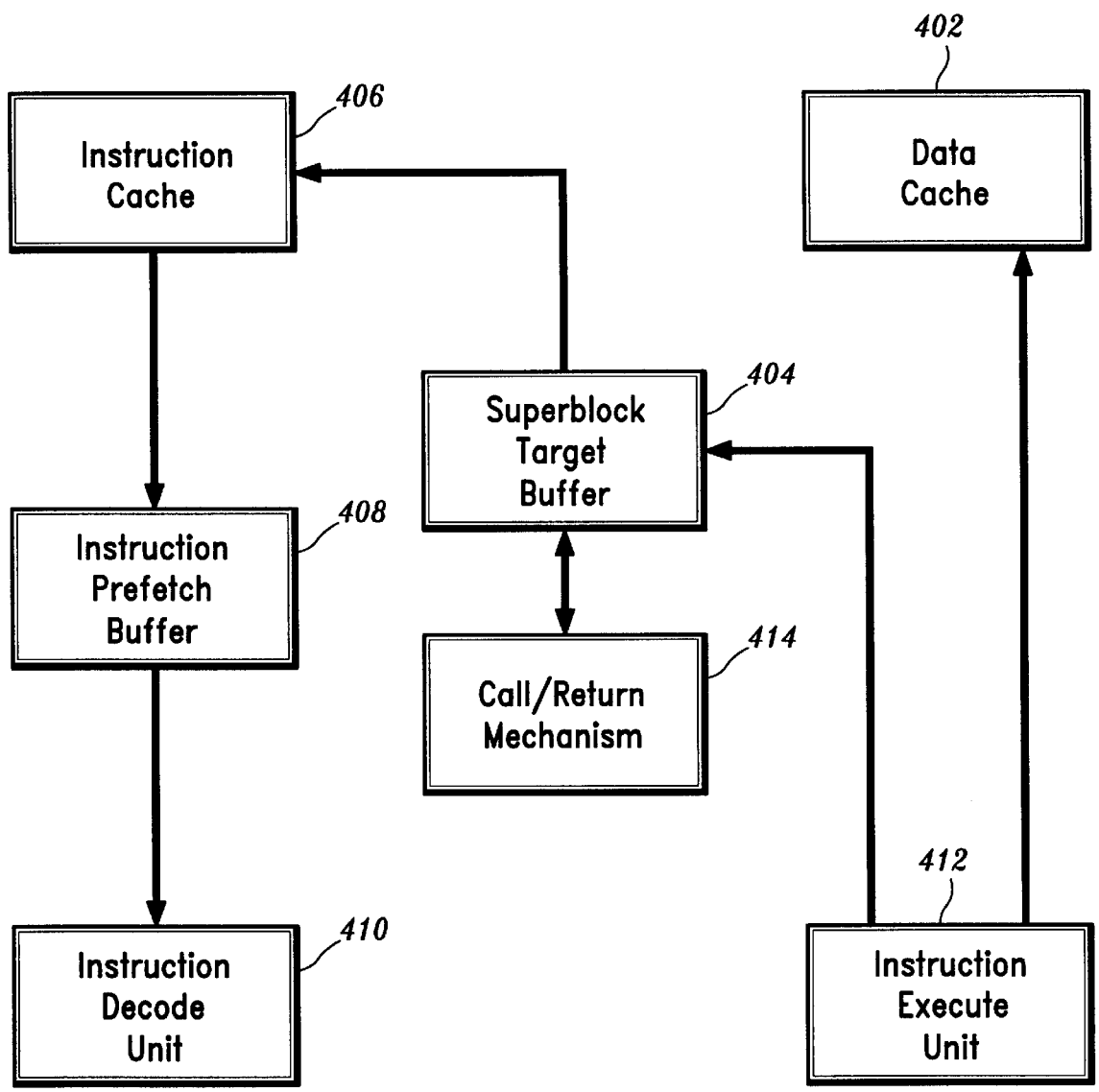
FIG. 1 is a block diagram of a computer processing system provided with hardware resources to support predicting the target of a subroutine return according to an embodiment of the present invention.

FIG. 1 is a block diagram of a computer processing system provided with hardware resources to support predicting the target of a subroutine return according to an embodiment of the present invention. Moreover, the computer processing system of FIG. 1 also supports the prefetching of superblocks as described in the above referenced YO999-012 patent application. The system 100 includes: a data cache 102; a superblock target buffer (STB) 104; an instruction cache (I-cache) 106; an instruction prefetch buffer 108; an instruction decode unit 110; an instruction execute unit 112; and a call/return mechanism 114. The call/return mechanism includes a call buffer and a return cache (shown in FIG. 2).

Figure 2A:
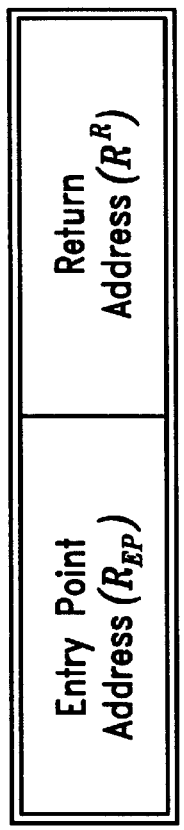
FIG. 2A is a diagram illustrating the various fields of the return cache according to an embodiment of the present invention.

The return cache is a set-associative cache that includes a plurality of entries (e.g., 256 entries arranged in a 4-way set-associative structure). The function of the return cache is to associate subroutine return points with subroutine entry points. FIG. 2A is a diagram illustrating the various fields of the return cache according to an embodiment of the present invention. The fields corresponding to each entry in the return cache include: a first field corresponding to an address of an entry point for a corresponding subroutine (hereinafter referred to as $R_{EP}$); a second field corresponding to an address of a return for the corresponding subroutine (hereinafter referred to as $R_R$).

Figure 2B:
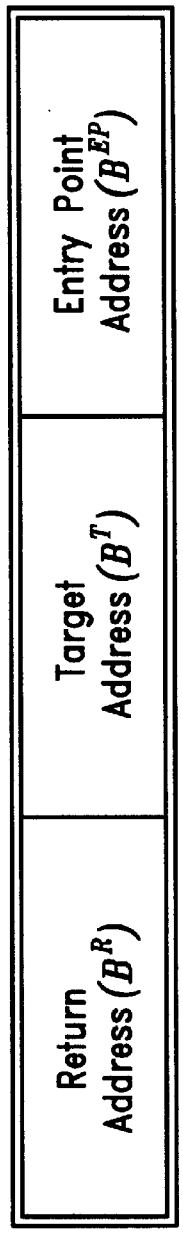
FIG. 2B is a diagram illustrating the various fields of the call buffer according to an embodiment of the present invention.

The call buffer is a content addressable memory that includes a plurality of entries (e.g., 16) arranged in a circular buffer and having a defined head pointer. The primary function of the call buffer is to enable the association of subroutine return branches with subroutine entry points. Thus, the call buffer keeps track of recent calling branches and their targets. FIG. 2B is a diagram illustrating the various fields of the call buffer according to an embodiment of the present invention. The fields corresponding to each entry in the return cache include: a first field corresponding to an address of a return for a subroutine (hereinafter referred to as $B_R$); a second field corresponding to an address of a target of the return for the subroutine (hereinafter referred to as $B_T$); and a third field corresponding to an address of an entry point for the subroutine (hereinafter referred to as $B_{EP}$).

Figure 2C:
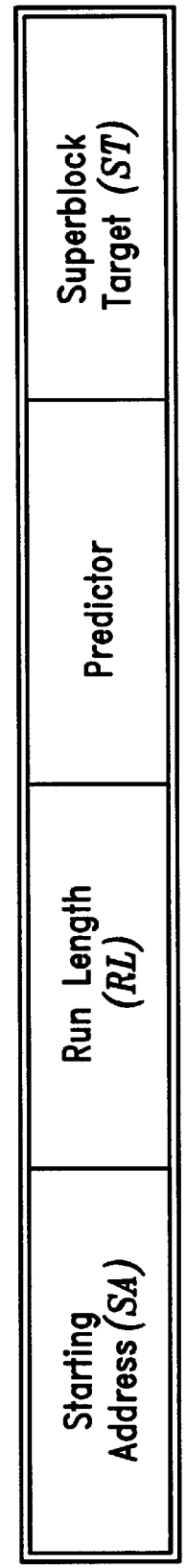
FIG. 2C is a diagram illustrating the various fields of an STB entry according to an embodiment of the present invention.

The Superblock Target Buffer (STB) is a set-associative cache having a plurality of entries therein. FIG. 2C is a diagram illustrating the various fields of an STB entry according to an embodiment of the present invention. The fields corresponding to each entry in STB 104 include: a first field corresponding to the run length (RL) of the superblock; a second field corresponding to the predictor; and a third field corresponding to a superblock target (ST). The starting address (SA) of a superblock is the identifier for each entry in STB 104.

The run length (RL) is the length of the superblock, and corresponds to the difference between the starting address of the next instruction immediately following the superblock (e.g., the next sequential superblock) and the starting address (SA) of the superblock. Thus, the sum of SA and RL provides the address of the location immediately following the superblock.

The predictor determines whether or not the terminating branch of the superblock should be presumed taken. If the predictor determines that the branch should be presumed taken, then the superblock target (ST) points to the address of the predicted next superblock. In a preferred embodiment of the present invention, the predictor is a 2-bit saturating up-down counter. However, it is to be appreciated that other history or direction predictors could also be employed in accordance with the present invention. It is to be appreciated that the predictor is an optional entry in the STB and, thus, may be omitted therefrom. In particular, the predictor entry in the STB may be omitted in the case when information in the instruction, such as the opcode, the sign of the displacement, or hint bits, are used to predict the direction of a branch. The predictor, i.e., the 2-bit saturating counter, is interpreted as shown in Table 1.

TABLE 1

| 00, 01 | target is fall-through address (i.e., SA + RL) |
| 10, 11 | target is provided by superblock target (ST) field |

Returning to FIG. 1, instructions are fetched from instruction cache 106 from addresses specified by STB 104. The fetched instructions are deposited in instruction prefetch buffer 108. Then, the instructions are taken sequentially from prefetch buffer 108 for decoding by instruction decode unit 110. The decoded instructions are executed in instruction execute unit 112.

In the course of execution, a branch instruction may be encountered. Execution of a branch instruction includes determining the direction of the branch and the target address of the branch. Information about this branch, including its address, whether or not it was taken, and the address of the instruction following the branch are dispatched to STB 104. This information is used to: confirm an earlier prediction for the branch; generate addresses for subsequent fetches from instruction cache 106; and update the prediction tables in STB 104.

The starting address of the superblock containing a return instruction is stored both in the Call Buffer and Return Cache of call/return mechanism 114. This allows the point to which the subroutine returns to be anticipated even before the return instruction is seen, thus allowing an early fetch of instructions from the caller.

In the normal case, the STB is indexed using the address of a superblock and returns a triple which includes the address of the target of the next taken branch. When implemented along with the call-return scheme of the present invention, an additional bit is associated with each entry to indicate that the target of this superblock is an entry to a subroutine. The address to which the subroutine returns is given by the sum of the starting address of the superblock and the run-length of the superblock. In order to make the call-return scheme operate with superblocks, the address stored in the $R_R$ and $B_R$ fields (described hereinafter) is the starting address of the superblock containing the return branch, instead of the address of the return branch.

Figure 3:
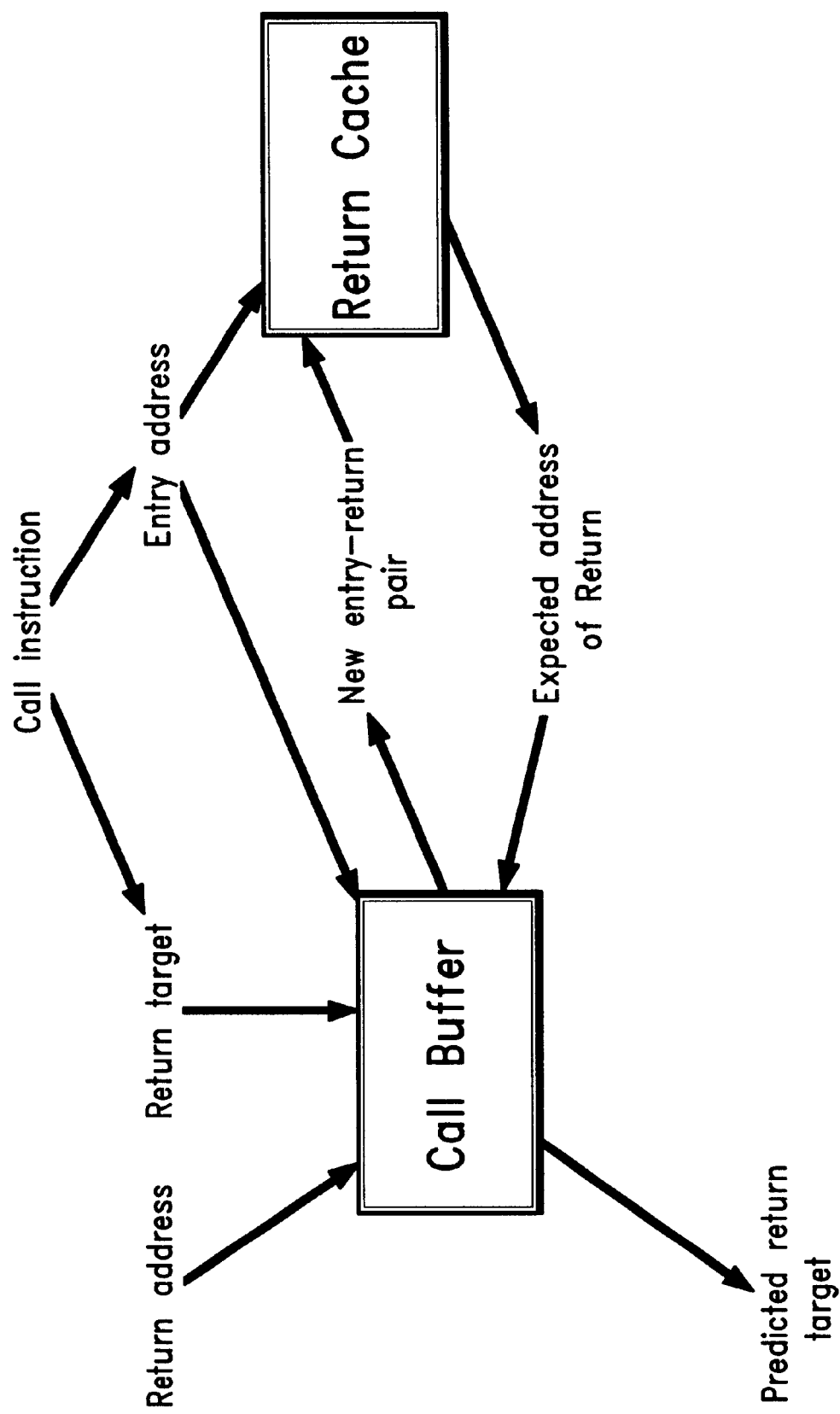
FIG. 3 is a block diagram of the call/return mechanism of FIG. 1 according to an embodiment of the present invention.

FIG. 3 is a block diagram of the call/return mechanism of FIG. 1 according to an embodiment of the present invention. In particular, FIG. 3 illustrates the relationship between the various addresses and the two structures of the call/return mechanism, i.e., the return cache and the call buffer.

When a subroutine return is expected, the corresponding subroutine entry point is matched with the contents of the Call Buffer to predict the point to which the subroutine returns.

For a given architecture, we first identify a set of instructions as being in the CALL class. Such instructions may include, but are not limited to, BAL in System/390 and BL in PowerPC. We also identify another set of instructions as being in the RETURN class. Such instructions may include, but are not limited to, $B_R$ in System/390 and BCLR in PowerPC. It is to be noted that an instruction may be in both classes.

Figure 4:
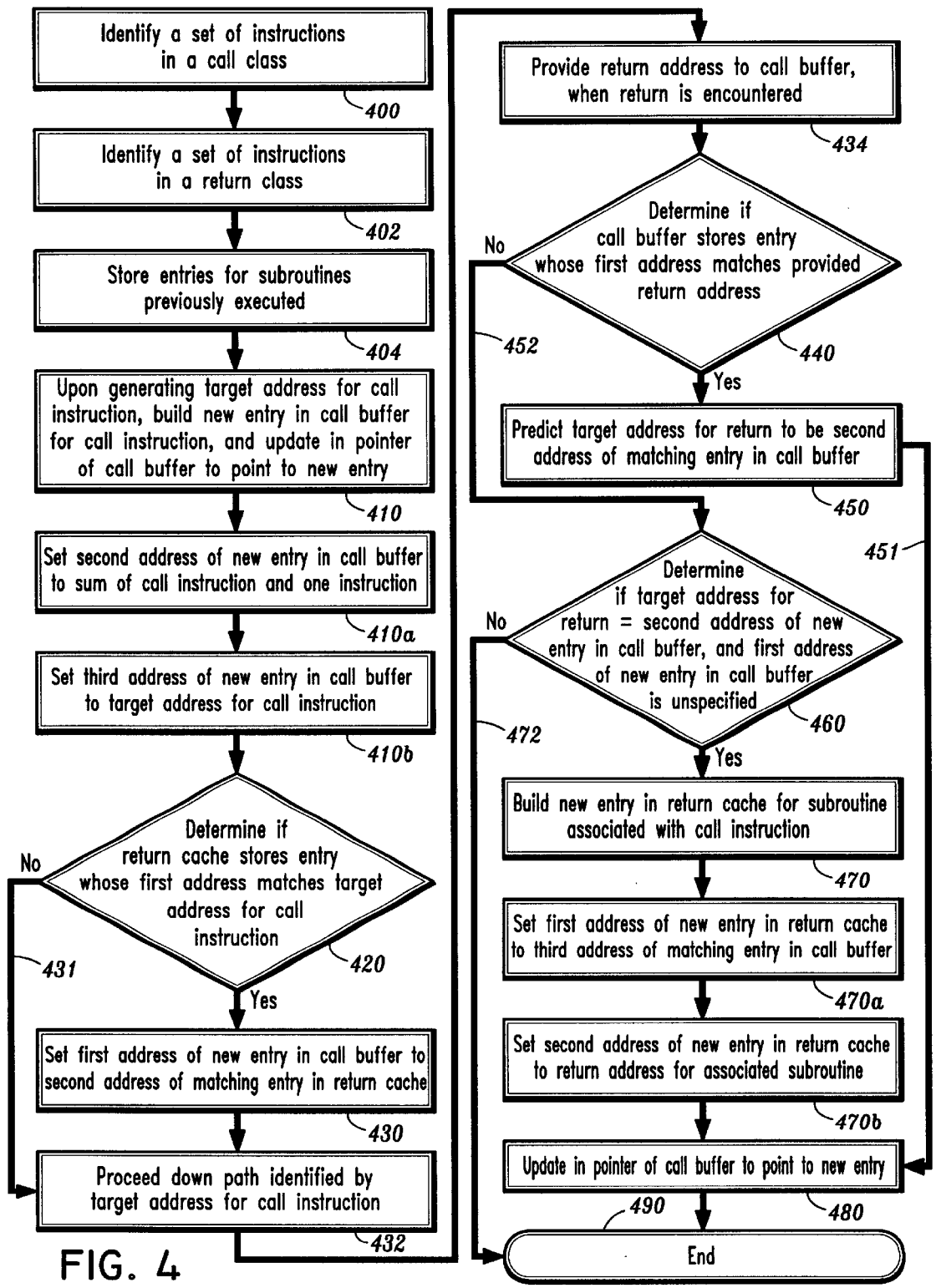
FIG. 4 is a flowchart of a method for predicting the target of a subroutine return branch according to an embodiment of the present invention.

FIG. 4 is a flowchart of a method for predicting the target of a subroutine return branch according to an embodiment of the present invention. A set of instructions in a call class is identified (step 400). Each instruction in the call class corresponds to a call to an associated subroutine. Moreover, a set of instructions in a return class is identified (step 402). Each instruction in the return class corresponds to a return from an associated subroutine.

In a return cache, entries are stored for subroutines that have been previously executed by the processor (step 404). As shown in FIG. 2A, each entry in the return cache includes: a first address ($C_{EP}$) identifying an entry point address for a corresponding subroutine; and a second address ($C_R$) identifying a return address for the corresponding subroutine.

Upon generation of a target address for an instruction in the call class (hereinafter "subroutine call instruction") associated with a subroutine, in a call buffer, a new entry is built for the subroutine call instruction and an in pointer of the call buffer is updated to point to the new entry (step 410).

In general, as shown in FIG. 2B, each entry in the call buffer includes: a first address ($B_R$) identifying a return address for a respective subroutine called by a corresponding subroutine call instruction; a second address ($B_T$) identifying a target address of the return for the respective subroutine; and a third address ($B_{EP}$) identifying an entry point address for the respective subroutine. However, in some cases, as will be illustrated below, the first address may be omitted from an entry in the call buffer.

According to step 410, the new entry in the call buffer is built as follows: the second address ($B_T$) of the new entry is set to an address corresponding to the sum of the subroutine call instruction and one instruction (step 410a); and the third address ($B_{EP}$) of the new entry is set to the target address for the subroutine call instruction (step 410b).

Then, it is determined whether or not the return cache stores an entry whose first address ($C_{EP}$) matches the target address for the subroutine call instruction (step 420). If so, then the first address ($B_R$) of the new entry in the call buffer is set to the second address ($C_R$) of the matching entry in the return cache (step 430). Else, the method proceeds to step 432 (step 431).

Processing then proceeds down the path identified by target address for the subroutine call instruction (step 432). When an instruction in the return class is encountered (hereinafter "return"), the address of the return (hereinafter "return address") is provided to the call buffer (step 434).

Subsequently, beginning at the entry immediately preceding the entry pointed to by the in pointer of the call buffer, it is determined whether or not the call buffer stores an entry whose first address ($B_R$) matches the return address (provided at step 434) (step 440). If so, then a target address for the return is predicted to be the second address ($B_T$) of the matching entry in the call buffer (step 450) and the method proceeds to step 480 (step 451). Else, the method proceeds to step 460 (step 452).

Upon generation of the target address for the return, it is then determined whether or not that target address is equal to the second address ($B_T$) of the new entry in the call buffer and also, whether or not the first address ($B_R$) of the new entry in the call buffer is unspecified (step 460). If so, then in the return cache, a new entry is built for the associated subroutine (step 470) and the method proceeds to step 480. Else, the method proceeds to step 490 (step 472). According to step 470, the new entry in the return cache is built as follows: the first address ($C_{EP}$) of the new entry in the return cache is set to the third address ($B_{EP}$) of the matching entry in the call buffer (step 470a); and the second address ($C_R$) of the new entry in the return cache is set to the return address for the associated subroutine (step 470b).

At step 480, the in pointer of the call buffer is updated to point to the new entry. At step 490, the method terminates.

To facilitate a clear understanding of the present invention, illustrative examples will now be given with respect to the method of FIG. 4. In the description of the examples, steps 400, 402, and 404 of the method of FIG. 4 (i.e., identifying a set of instructions in a call class, identifying a set of instructions in a return class, and storing entries for subroutines that have been executed in a return cache) are presumed to have been already performed and are thus not described. Moreover, the return cache and call buffer are presumed to have entries as described above. That is, the return cache includes entries having a first ($C_{EP}$) and a second address ($C_R$), and the call buffer includes entries having a first ($B_R$), second ($B_T$), and a third address ($B_{EP}$) as described above. Further, presumptions are made regarding whether matching entries exist in the return cache and in the call buffer, corresponding to steps 420 and 440 of the method of FIG. 4, respectively. These presumptions are made to clearly illustrate the various possibilities which may be encountered in executing the method of FIG. 4 and the results associated therewith. When portions of the following descriptions relate to the steps of the method of FIG. 4, those specific steps will be referenced in parenthesis to allow cross-referencing between the following examples and the method.

Figure 5:
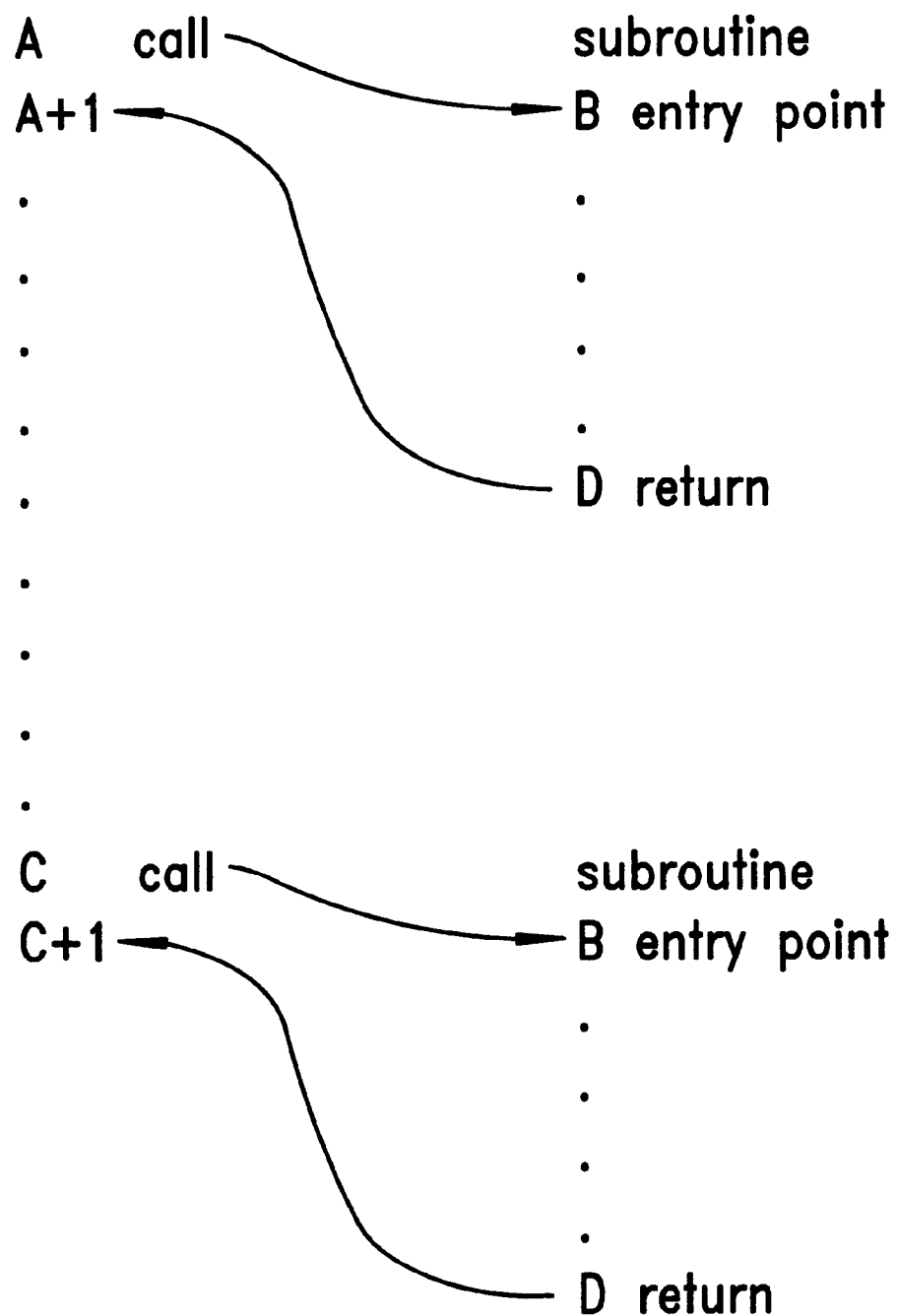
FIG. 5 is a diagram illustrating a first scenario to which the present invention is applied wherein calls are made from a running program to a subroutine.

A first illustrative example is provided with respect to FIG. 5, which is a diagram illustrating a first scenario to which the present invention is applied wherein calls are made from a running program to a subroutine. In this example, a first and a second subroutine call instruction both call the same subroutine. In FIG. 5, the addresses of the first and second subroutine call instructions are represented by "A" and "C", respectively. The addresses of the entry point and return for the subroutine are represented by "B" and "D", respectively. The target addresses of the return "D" are represented by "A+1" and "C+1".

The method of FIG. 4 will now be applied to the first subroutine call instruction of FIG. 5. Upon generation of a target address "B" for the first subroutine call instruction at address "A", a new entry is built in a call buffer for the first subroutine call instruction and an in pointer of the call buffer is updated to point to the new entry (step 410). According to step 410, the new entry is built as follows: the second address ($B_T$) of the new entry is set to "A+1" (step 410a); and the third address ($B_{EP}$) of the new entry is set to "B" (step 410b).

Then, it is determined whether or not the return cache stores an entry whose first address ($C_{EP}$) matches "B" (step 420). Here, it is presumed that a matching entry does not exist in the return cache.

Processing then proceeds down the path identified by the target address "B" for the first subroutine call instruction (step 432). When the return corresponding to return address "D" is encountered, the return address "D" is provided to the call buffer (step 434).

Subsequently, beginning at the entry immediately preceding the entry pointed to by the in pointer of the call buffer, it is determined whether or not the call buffer stores an entry whose first address ($B_R$) matches "D" (step 440). Here, it is presumed that a matching entry does not exist in the call buffer. Thus, the method proceeds to step 460.

Upon generation of the target address "A+1" of the return "D" for the associated subroutine, it is then determined whether or not "A+1" is equal to the second address ($B_T$) of the new entry in the call buffer and also, whether or not the first address ($B_R$) of the new entry in the call buffer is unspecified (step 460). Here, "A+1" equals $B_T$ (see step 410a) and $B_R$ is unspecified. Thus, in the return cache, a new entry is built for the subroutine (step 470) and the method proceeds to step 480. According to step 470, the new entry in the return cache is built as follows: the first address ($C_{EP}$) of the new entry in the return cache is set to "B" (step 470a); and the second address ($C_R$) of the new entry in the return cache is set to "D" (step 470b).

At step 480, the in pointer of the call buffer is updated to point to the new entry. At step 490, the method terminates.

The method of FIG. 3 will now be applied to the second subroutine call instruction of FIG. 4. Upon generation of a target address "B" for the second subroutine call instruction at address "C", a new entry is built in a call buffer for the second subroutine call instruction and an in pointer of the call buffer is updated to point to the new entry (step 410). According to step 410, the new entry is built as follows: the second address ($B_T$) of the new entry is set to "C+1" (step 410*a*); and the third address ($B_{EP}$) of the new entry is set to "B" (step 410*b*).

Then, it is determined whether or not the return cache stores an entry whose first address ($C_{EP}$) matches "B" (step 420). Here, it is presumed that a matching entry does exist in the return cache. Accordingly, the first address ($B_R$) of the new entry in the call buffer is set to "D" (step 430).

Processing then proceeds down the path identified by the target address "B" for the second subroutine call instruction (step 432). When the return corresponding to return address "D" is encountered, the return address "D" is provided to the call buffer (step 434).

Subsequently, beginning at the entry immediately preceding the entry pointed to by the in pointer of the call buffer, it is determined whether or not the call buffer stores an entry whose first address ($B_R$) matches "D" (step 440). Here, a matching entry does exist in the call buffer (see step 430). Thus, a target address of the return "D" for the associated subroutine is predicted to be C+1 (step 450) and the method proceeds to step 480.

At step 480, the in pointer of the call buffer is updated to point to the new entry. At step 490, the method terminates.

Figure 6:
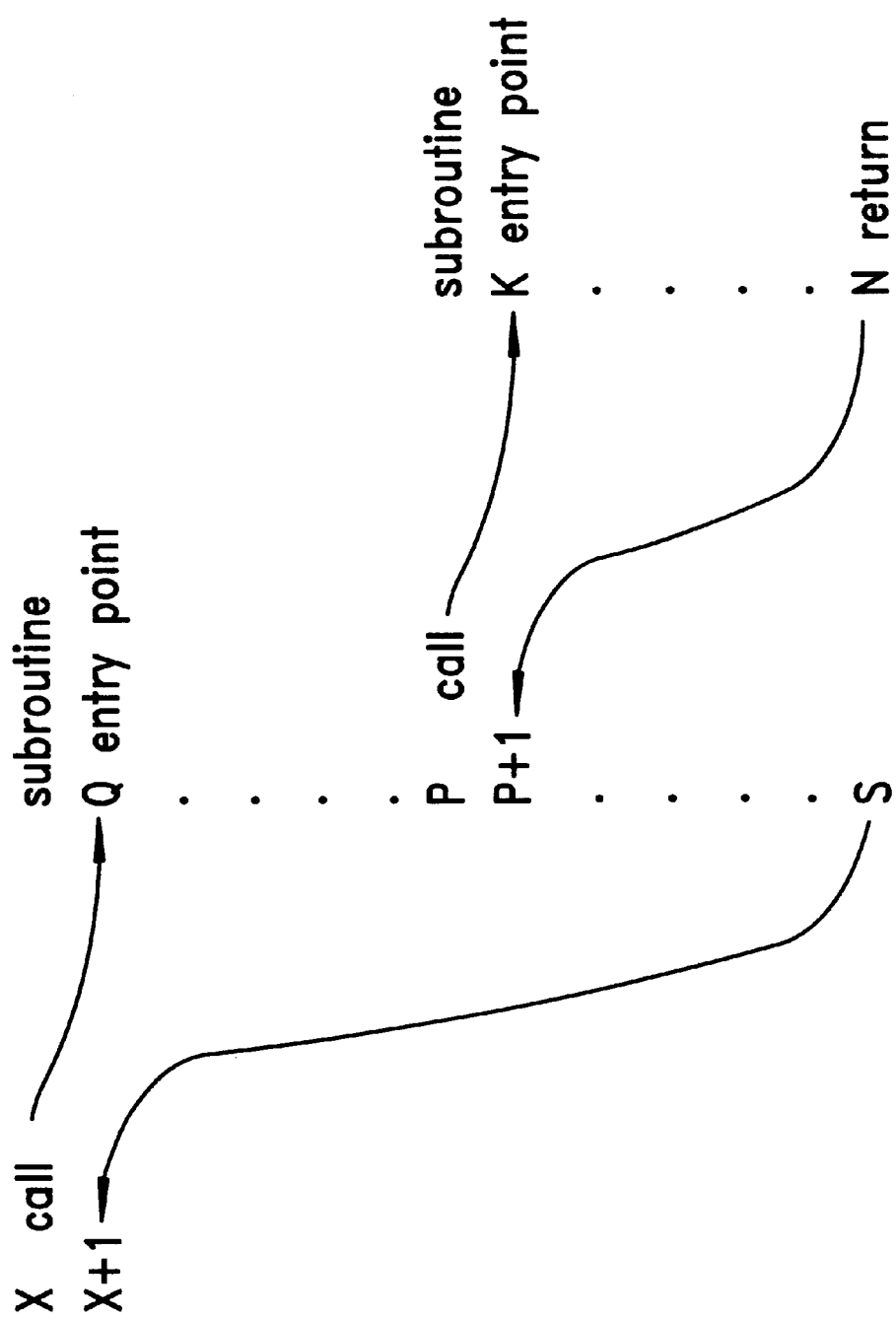
FIG. 6 is a diagram illustrating a second scenario to which the present invention is applied wherein nested calls are made from a running program to multiple subroutines.

A second illustrative example is provided with respect to FIG. 6, which is a diagram illustrating a second scenario to which the present invention is applied wherein nested calls are made from a running program to multiple subroutines. In this example, a first subroutine call instruction calls a first subroutine which contains a second subroutine call instruction which calls a second subroutine. In FIG. 6, the addresses of the first and second subroutine call instructions are represented by "X" and "P", respectively. The addresses of the entry points for the first and second subroutines are represented by "Q" and "K", respectively. The addresses of the returns for the first and second subroutines are represented by "S" and "N", respectively. The target address of the return "S" for the first subroutine is represented by "X+1". The target address of the return "N" for the second subroutine is represented by "P+1".

The method of FIG. 4 will now be applied to the first subroutine call instruction of FIG. 6. Upon generation of a target address "Q" for the first subroutine call instruction at address "X", a new entry is built in a call buffer for the first subroutine call instruction and an in pointer of the call buffer is updated to point to the new entry (step 410). According to step 410, the new entry is built as follows: the second address ($B_T$) of the new entry is set to "X+1" (step 410*a*); and the third address ($B_{EP}$) of the new entry is set to "Q" (step 410*b*).

Then, it is determined whether or not the return cache stores an entry whose first address ($C_{EP}$) matches "Q" (step 420). Here, it is presumed that a matching entry does not exist in the return cache.

Processing then proceeds down the path identified by the target address "Q" for the first subroutine call instruction (step 432), at which point second subroutine call instruction "P" is encountered. When the return corresponding to return address "N" is encountered, the return address "N" is provided to the call buffer (step 434).

Subsequently, beginning at the entry immediately preceding the entry pointed to by the in pointer of the call buffer, it is determined whether or not the call buffer stores an entry whose first address ($B_R$) matches "N" (step 440). Here, it is presumed that a matching entry does not exist in the call buffer. Thus, the method proceeds to step 460.

Upon generation of the target address "P+1" of the return "N" for the associated subroutine, it is then determined whether or not "P+1" is equal to the second address ($B_T$) of the new entry in the call buffer and also, whether or not the first address ($B_R$) of the new entry in the call buffer is unspecified (step 460). Here, "P+1" does not equal $B_T$, since $B_T$ is equal to "X+1" (see step 410*a*). Thus, the method proceeds to step 490.

At step 490, the method terminates.

The method of FIG. 4 will now be applied to the second subroutine call instruction of FIG. 6. Upon generation of a target address "K" for the second subroutine call instruction at address "P", a new entry is built in a call buffer for the second subroutine call instruction and an in pointer of the call buffer is updated to point to the new entry (step 410). According to step 410, the new entry is built as follows: the second address ($B_T$) of the new entry is set to "P+1" (step 410*a*); and the third address ($B_{EP}$) of the new entry is set to "K" (step 410*b*).

Then, it is determined whether or not the return cache stores an entry whose first address ($C_{EP}$) matches "K" (step 420). Here, it is presumed that a matching entry does not exist in the return cache.

Processing then proceeds down the path identified by the target address "K" for the second subroutine call instruction (step 432). When the return corresponding to return address "N" is encountered, the return address "N" is provided to the call buffer (step 434).

Subsequently, beginning at the entry immediately preceding the entry pointed to by the in pointer of the call buffer, it is determined whether or not the call buffer stores an entry whose first address ($B_R$) matches "N" (step 440). Here, it is presumed that a matching entry does not exist in the call buffer. Thus, the method proceeds to step 460.

Upon generation of the target address "P+1" of the return "N" for the associated subroutine, it is then determined whether or not "P+1" is equal to the second address ($B_T$) of the new entry in the call buffer and also, whether or not the first address ($B_R$) of the new entry in the call buffer is unspecified (step 460). Here, "P+1" equals $B_T$ (see step 410*a*) and $B_R$ is unspecified. Thus, in the return cache, a new entry is built for the subroutine (step 470) and the method proceeds to step 480. According to step 470, the new entry in the return cache is built as follows: the first address ($C_{EP}$) of the new entry in the return cache is set to "K" (step 470*a*); and the second address ($C_R$) of the new entry in the return cache is set to "N" (step 470*b*).

At step 480, the in pointer of the call buffer is updated to point to the new entry.

Subsequently, beginning at the entry immediately preceding the entry pointed to by the in pointer of the call buffer, it is determined whether or not the call buffer stores an entry whose first address ($B_R$) matches "S" (step 440). Here, it is presumed that a matching entry does not exist in the call buffer.

Upon generation of the target address "X+1" of the return for the associated subroutine, it is then determined whether or not "X+1" is equal to the second address ($B_T$) of the new entry in the call buffer and also, whether or not the first address ($B_R$) of the new entry in the call buffer is unspecified (step 460). Here, "X+1" equals $B_T$ (see step 410*a*) and $B_R$ is unspecified. Thus, in the return cache, a new entry is built for the subroutine (step 470) and the method proceeds to step 480. According to step 470, the new entry in the return cache is built as follows: the first address ($C_{EP}$) of the new entry in the return cache is set to "Q" (step 470a); and the second address ($C_R$) of the new entry in the return cache is set to "S" (step 470b).

At step 480, the in pointer of the call buffer is updated to point to the new entry. At step 490, the method terminates.

The present invention may also be employed in the S case of "foliated" subroutines. These are subroutines which are not leaf subroutines, but which call other leaf subroutines at the tail end of their execution using a regular branch, rather than through a branch-and-link. The result is that, on completion, the leaf subroutine jumps a level and returns to the caller of the "foliated" subroutine, thus saving an intermediate return instruction. In these cases, the association is made in the Return Cache between the entry point of the "foliated" subroutine and the return from the actual leaf subroutine.

Figure 7:
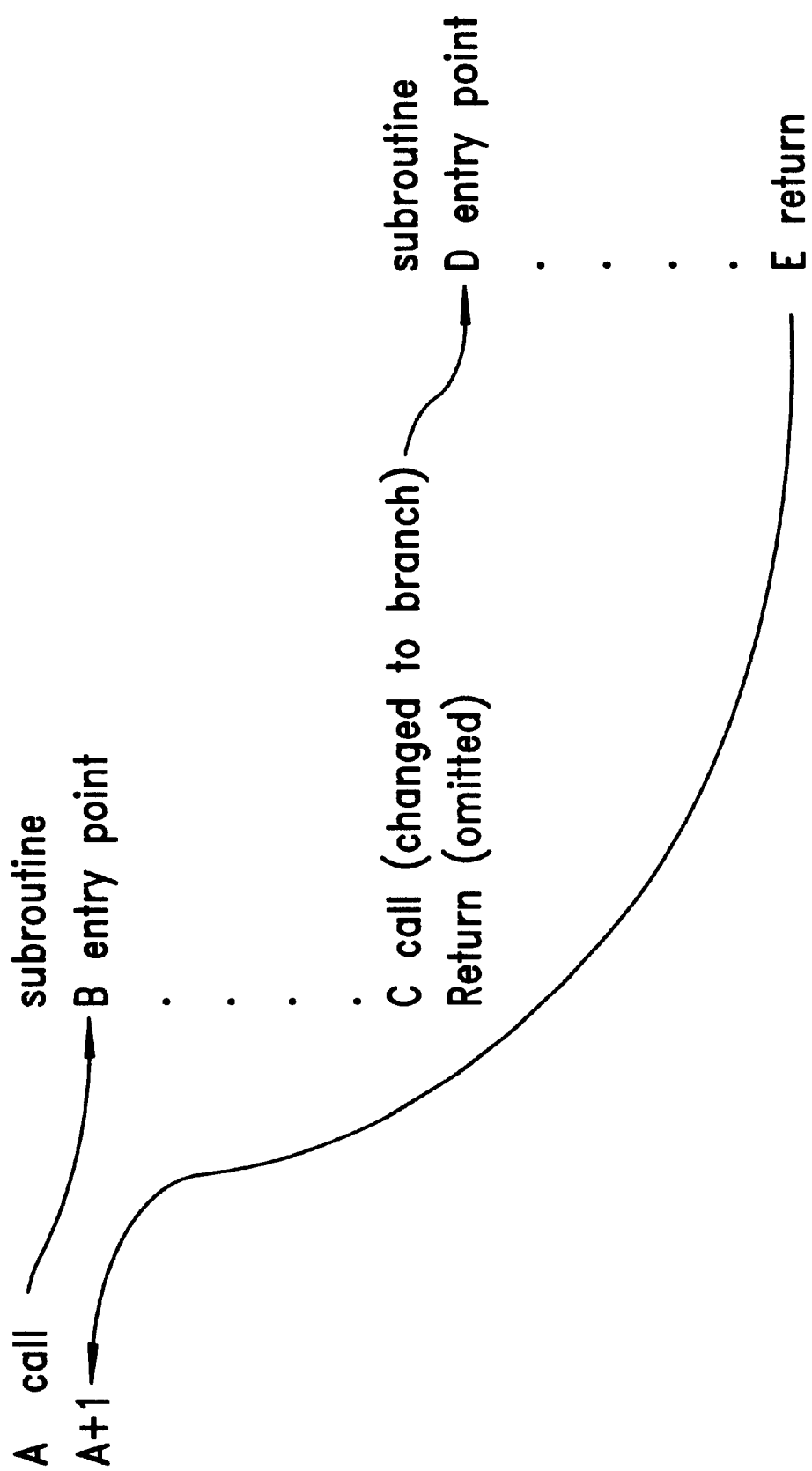
FIG. 7 is a diagram illustrating a third scenario to which the present invention is applied wherein calls are made from a running program to a foliated subroutine.

An illustrative example corresponding to foliated subroutines is provided with respect to FIG. 7, which is a diagram illustrating a third scenario to which the present invention is applied wherein calls are made from a running program to a foliated subroutine. In this example, a first subroutine call instruction calls a first subroutine, and a second subroutine call instruction of the first subroutine calls a second subroutine. In FIG. 7, the addresses of the first and second subroutine call instructions are represented by "A" and "C", respectively. The addresses of the entry points for the first and second subroutines are represented by "B" and "D", respectively. The return of the first subroutine has been omitted, and the return of the second subroutine is represented by "E". The target address of the return "E" is represented by "A+1".

The method of FIG. 4 will now be applied to the first subroutine call instruction of FIG. 7. Upon generation of a target address "B" for the first subroutine call instruction at address "A", a new entry is built in a call buffer for the first subroutine call instruction and an in pointer of the call buffer is updated to point to the new entry (step 410). According to step 410, the new entry is built as follows: the second address ($B_T$) of the new entry is set to "A+1" (step 410a); and the third address ($B_{EP}$) of the new entry is set to "B" (step 410b).

Then, it is determined whether or not the return cache stores an entry whose first address ($C_{EP}$) matches "B" (step 420). Here, it is presumed that a matching entry does not exist in the return cache.

Processing then proceeds down the path identified by the target address "B" for the first subroutine call instruction (step 432), at which point return "E" is encountered. The return address "E" corresponding to the return (which has been converted to a direct branch instruction) is provided to the call buffer (step 434).

Subsequently, beginning at the entry immediately preceding the entry pointed to by the in pointer of the call buffer, it is determined whether or not the call buffer stores an entry whose first address ($B_R$) matches "E" (step 440). Here, it is presumed that a matching entry does not exist in the call buffer. Thus, the method proceeds to step 460.

Upon generation of the target address "A+1" of the return "D" for the associated subroutine, it is then determined whether or not "A+1" is equal to the second address ($B_T$) of the new entry in the call buffer and also, whether or not the first address ($B_R$) of the new entry in the call buffer is unspecified (step 460). Here, "A+1" equals $B_T$ (see step 410a) and $B_R$ is unspecified. Thus, in the return cache, a new entry is built for the subroutine (step 470) and the method proceeds to step 480. According to step 470, the new entry in the return cache is built as follows: the first address ($C_{EP}$) of the new entry in the return cache is set to "B" (step 470a); and the second address ($C_R$) of the new entry in the return cache is set to "E" (step 470b).

At step 480, the in pointer of the call buffer is updated to point to the new entry. At step 490, the method terminates.

Figure 8:
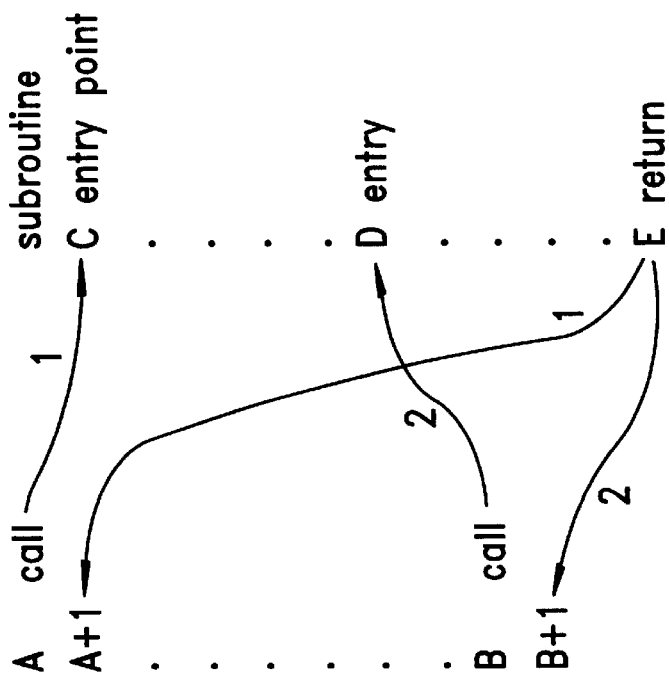
FIG. 8 is a diagram illustrating a fourth scenario to which the present invention is applied wherein calls are made from a running program to a subroutine having multiple entry points.

The present invention may also be employed in the case of a subroutine that has multiple entry points. An illustrative example corresponding to a subroutine having multiple entry points is provided with respect to FIG. 8, which is a diagram illustrating a fourth scenario to which the present invention is applied wherein calls are made from a running program to a subroutine having multiple entry points. In this example, a first subroutine call instruction of the running program calls a first subroutine at a first entry point, and a second subroutine call instruction of the running program calls the first subroutine at a second entry point. In FIG. 8, the addresses of the first and second subroutine call instructions are represented by "A" and "B", respectively. The addresses of the entry points for the first subroutine corresponding to the first and second subroutine call instructions are represented by "C" and "D", respectively. The return of the first subroutine is represented by "E". The target addresses of the return "E" are represented by "A+1" and "B+1".

The method of FIG. 4 will now be applied to the first subroutine call instruction of FIG. 8. Upon generation of a target address "C" for the first subroutine call instruction at address "A", a new entry is built in a call buffer for the first subroutine call instruction and an in pointer of the call buffer is updated to point to the new entry (step 410). According to step 410, the new entry is built as follows: the second address ($B_T$) of the new entry is set to "A+1" (step 410a); and the third address ($B_{EP}$) of the new entry is set to "C" (step 410b).

Then, it is determined whether or not the return cache stores an entry whose first address ($C_{EP}$) matches "C" (step 420). Here, it is presumed that a matching entry does not exist in the return cache.

Processing then proceeds down the path identified by the target address "C" for the first subroutine call instruction (step 432). When the return corresponding to return address "E" is encountered, the return address "E" is provided to the call buffer (step 434).

Subsequently, beginning at the entry immediately preceding the entry pointed to by the in pointer of the call buffer, it is determined whether or not the call buffer stores an entry whose first address ($B_R$) matches "E" (step 440). Here, it is presumed that a matching entry does not exist in the call buffer. Thus, the method proceeds to step 460.

Upon generation of the target address "A+1" of the return "E" for the associated subroutine, it is then determined whether or not "A+1" is equal to the second address ($B_T$) of the new entry in the call buffer and also, whether or not the first address ($B_R$) of the new entry in the call buffer is unspecified (step 460). Here, "A+1" equals $B_T$ (see step 410a) and $B_R$ is unspecified. Thus, in the return cache, a new entry is built for the subroutine (step 470) and the method proceeds to step 480. According to step 470, the new entry in the return cache is built as follows: the first address ($C_{EP}$) of the new entry in the return cache is set to "C" (step 470a); and the second address ($C_R$) of the new entry in the return cache is set to "E" (step 470b).

At step 480, the in pointer of the call buffer is updated to point to the new entry. At step 490, the method terminates.

The method of FIG. 4 will now be applied to the second subroutine call instruction of FIG. 8. Upon generation of a target address "D" for the second subroutine call instruction at address "B", a new entry is built in a call buffer for the second subroutine call instruction and an in pointer of the call buffer is updated to point to the new entry (step 410). According to step 410, the new entry is built as follows: the second address ($B_T$) of the new entry is set to "B+1" (step 410a); and the third address ($B_{EP}$) of the new entry is set to "D" (step 410b).

Then, it is determined whether or not the return cache stores an entry whose first address ($C_{EP}$) matches "D" (step 420). Here, it is presumed that a matching entry does not exist in the return cache.

Processing then proceeds down the path identified by the target address "D" for the second subroutine call instruction (step 432). When the return corresponding to return address "E" is encountered, the return address "E" is provided to the call buffer (step 434).

Subsequently, beginning at the entry immediately preceding the entry pointed to by the in pointer of the call buffer, it is determined whether or not the call buffer stores an entry whose first address ($B_R$) matches "E" (step 440). Here, it is presumed that a matching entry does not exist in the call buffer. Thus, the method proceeds to step 460.

Upon generation of the target address "B+1" of the return "E" for the associated subroutine, it is then determined whether or not "B+1" is equal to the second address ($B_T$) of the new entry in the call buffer and also, whether or not the first address ($B_R$) of the new entry in the call buffer is unspecified (step 460). Here, "B+1" equals $B_T$ (see step 410a) and $B_R$ is unspecified. Thus, in the return cache, a new entry is built for the subroutine (step 470) and the method proceeds to step 480. According to step 470, the new entry in the return cache is built as follows: the first address ($C_{EP}$) of the new entry in the return cache is set to "D" (step 470a); and the second address ($C_R$) of the new entry in the return cache is set to "E" (step 470b).

At step 480, the in pointer of the call buffer is updated to point to the new entry. At step 490, the method terminates.

It is to be appreciated that the present invention may also be employed in the case of subroutine invocations through stubs such as, for example, in the cases of virtual method invocation or dynamic library procedure invocation. In these cases, the present invention essentially treats the stub as part of the invoked procedure, thus dynamically associating the subroutine return with the stub entry point.

A brief description of the present invention with respect to Branch History Tables (BHTs) will now be given. The call buffer and the return cache of the present invention should typically be used in conjunction with a Branch History Table (BHT). In such a context, the BHT would be used to predict the targets of all branches other than those predicted by the call/return scheme. Prediction is attempted in parallel using both the BHT as well as the call/return hardware, with the latter being selected if it could make a prediction, using a late-select scheme. This is more effective than conventional schemes which attempt to flag in the BHT those branches whose predictions should be attempted by the call/return scheme.

In a conventional BHT scheme, the address of the target of a branch would be predicted by an entry in the BHT. Thus, both calls and returns would have entries in the BHT indicating the targets for the respective branches. When used in conjunction with the call-return scheme of the present invention, the return target would also be predicted with high probability. This value may differ from the value predicted by the BHT because the BHT would typically predict the target to be the same as what it had encountered the previous time. The call-return scheme, on the other hand, would have determined the matching calling branch and would predict accurately the target of the return. Thus, when the two are implemented together, prediction is always attempted using both the BHT as well as the call-buffer, with the latter being selected in case an entry exists in both places.

A description of an extension of the subroutine return predicting method of the present invention which includes multiple return points will now be given. Initially, it is to be appreciated that one of the characteristics of the present invention is that it associates a unique return point with each subroutine entry. Thus, the present invention has no difficulty with multiple subroutine entry points as long as there is only one return point. However, if there are several return points for a single entry point, the invention mispredicts whenever there is a change in the point from which the subroutine returns. This can be resolved by an extension to the above method of the present invention. The extension involves allowing multiple entries corresponding to an entry point in the Return Cache. The maximum number of entries that can be accommodated for a given entry point is the associativity of the Return Cache. When multiple hits occur in the Return Cache, all entries that hit must be in the same set of the associative structure. It is sufficient to replicate the head entry in the Call Buffer, introducing one entry for each potential return point.

For improved accuracy, it would be desirable to flush all such replicated entries when a return instruction hits in the Call Buffer. Alternatively, multiple $R_R$ fields (up to the associativity of the Return Cache) could be associated with each entry in the Call Buffer. All such fields are searched associatively for a return branch address.

Figure 9:
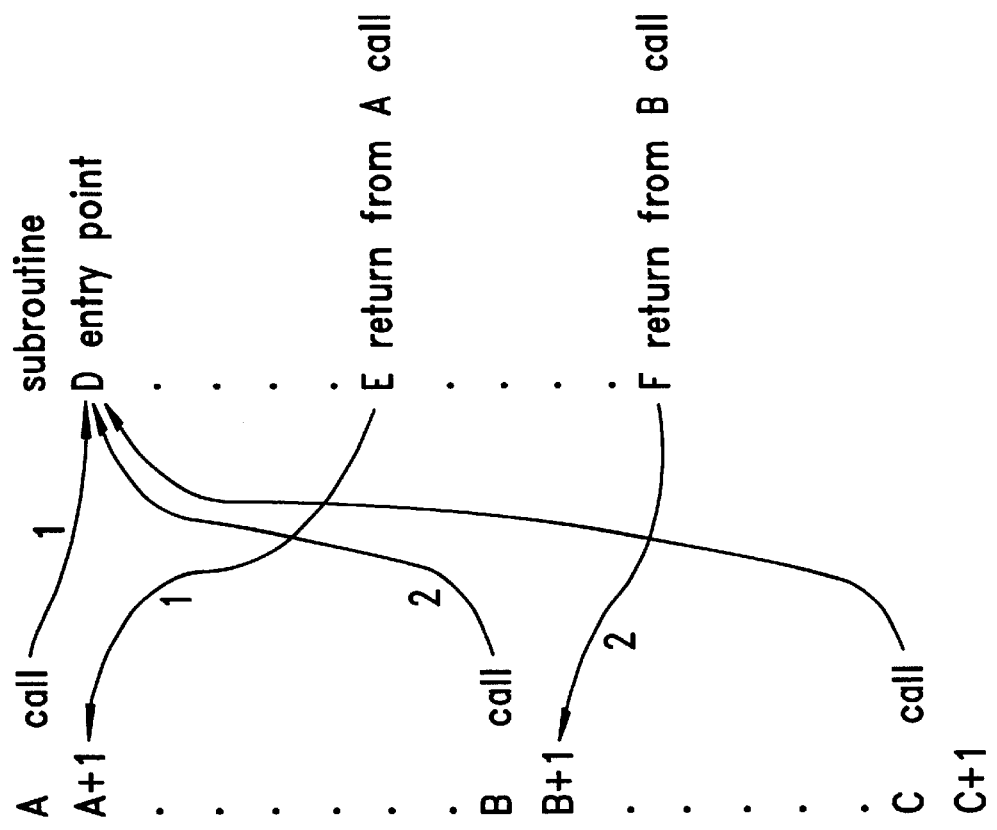
FIG. 9 is a diagram illustrating a fifth scenario to which the present invention is applied wherein calls are made from a running program to a subroutine having multiple return points.

FIG. 9 is a diagram illustrating a fifth scenario to which the present invention is applied wherein calls are made from a running program to a subroutine having multiple return points. In this example, first, second, and third subroutine call instructions of the running program call a subroutine at the same entry point. However, there is a different return corresponding to each call. In FIG. 9, the addresses of the first, second, and third subroutine call instructions are represented by "A", "B", and "C", respectively. The address of the entry point for the subroutine corresponding to the first, second, and third subroutine call instructions is represented by "D". The return of the subroutine corresponding to the first subroutine call instructions is represented by "E". The return of the subroutine corresponding to the second subroutine call instructions is represented by "F". The target addresses of the returns "E" and "F" are represented by "A+1" and "B+1", respectively.

As stated above, multiple entries are allowed for the return address field ($R_R$) of the return cache and for the return address field ($B_R$) of the call buffer. Thus, the return cache will contain an entry consisting of: (D, (E, F)). After A and B have been called once, the next call to D will build the following entry in the call buffer pointed to by the in pointer: ((E, F), C+1, D). If a match occurs with either address in the pair of addresses shown, the target is predicted as C+1. This allows the return for C to occur either from E or from F. It is to be appreciated that the above method may be generalized for an arbitrary number of return points.

A brief description of the present invention with respect to some of the prior conventional schemes will now be given.

Such description begins with a comparison of the present invention to the scheme described in the above referenced article by Webb, IBM Technical Disclosure Bulletin Vol. 30, No. 11, April 1988, pp. 221–225, "Subroutine Call/Return Stack". Webb's scheme employs only two fields, ra and ta, corresponding to $B_T$ and $B_{EP}$, respectively, in the "Call/Return Stack", rather than the three fields, $B_T$, $B_{EP}$, and $B_R$, of our Call Buffer. On encountering a RETURN class instruction our Call Buffer associatively finds its target in a single step, whereas Webb's scheme has to first associate the ta field with the return before employing the Call/Return Stack to determine the target of the return. This two-step process of Webb could take up to an extra cycle to predict the address of a return. It is more efficient to perform a two-step process during the installation of a call—the Return Cache is accessed when a CALL class instruction is encountered to enter the $B_R$ value in the Call Buffer. This is usually far in advance of the return—the time when this information is needed. In support of this, the Return Cache stores this information indexed by the address of the subroutine entry point, whereas the Webb scheme stores the entry-return pair information indexed by the address of the return.

The other difference is that the Return Cache of the present invention is a structure independent from the Branch History Table (BHT) used for prediction of other types of branches. These two functions were merged into the BHT in Webb's scheme. By separating the two, one can now design the structures optimally for both cases. For example, we are now able to index the Return Cache using the subroutine entry address, rather than the branch address, which is suitable for indexing the BHT. Moreover, by omitting all branches that are identified to be returns from the BHT, the effectiveness of the BHT is also potentially improved.

The third difference is that Webb's scheme permits multiple returns for a given entry point but not multiple entry points for the same return. Our scheme without the extension is exactly the reverse, it permits multiple entry points for the same return but not multiple returns for the same entry point. Our extended scheme eliminates such limitations almost entirely.

Finally, the above extensions to present invention also attempt to predict the target of a return the first time it is encountered. This improves the 'compulsory' misses that occur otherwise for new return instructions. Thus, as is evident, the present invention improves upon the Webb scheme in several ways.

A paper by Kaeli and Emma, entitled "Branch History Table prediction of Moving Target Branches Due to Subroutine Returns", Proc. 18th ISCA, pp. 24–42, 1991, essentially describes an embodiment of the Webb scheme. It has the same characteristics as the Webb scheme described above.

Another paper by Hilgendorf and Heim, entitled "Evaluation of Branch Prediction Methods on Traces from Commercial Applications", (presented at a Workshop in conjunction with HPCA 1998) also describes another embodiment of Webb's scheme but with the Return Cache separated from the BHT. However, they leave a pointer in the BHT to those branches identified to be subroutine returns. We feel it is better to access the Call/Return predictor in parallel with the BHT, accepting the prediction from the Call/Return Predictor if it has a hit, thus saving entries in the BHT. Such a mechanism also avoids the need for special controls if either the BHT entry or the Return Cache entry gets swapped out during cache replacement.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for associating subroutine return branches with corresponding targets, comprising the steps of:

storing in a first table a plurality of entries for at least one subroutine that has been executed, wherein each entry in the first table comprises:

a first table first address identifying an entry point address for a corresponding subroutine and a first table second address identifying a return address of a return for the corresponding subroutine;

upon generation of a target address for a subroutine call instruction associated with a subroutine, in a second table, building a new entry for the subroutine call instruction and updating an in pointer of the second table to point to the new entry, wherein each entry in the second table comprises:

a second table first address identifying a return address of a return for a respective subroutine called by a corresponding subroutine call instruction, a second table second address identifying a target address of the return for the respective subroutine, and a second table third address identifying an entry point address for the respective subroutine, said building step comprising the steps of:

setting a second table second address of the new entry to an address corresponding to a sum of the subroutine call instruction and one instruction;

setting a second table third address of the new entry to the target address for the subroutine call instruction;

determining whether the first table stores an entry whose first table first address matches the target address for the subroutine call instruction; and if so, setting a second table first address of the new entry to the first table second address of the matching entry.

2. The method according to claim 1, further comprising the steps of:

determining whether the second table stores an entry whose second table first address corresponds to a return address for the associated subroutine;

if so, predicting a target address of the return for the associated subroutine to be the second table second address of the corresponding entry.

3. The method of claim 2, wherein said step of determining whether the second table stores an entry whose second table first address corresponds to the return address for the associated subroutine is performed beginning at an entry immediately preceding an entry pointed to by the in pointer of the second table.

4. The method of claim 2, further comprising the step of updating the in pointer of the second table to point to the new entry.

5. The method according to claim 1, further comprising the steps of:

upon generation of the target address of the return for the associated subroutine, determining whether the target address of the return for the associated subroutine is equal to the second table second address of the corresponding entry and whether the second table first address of the corresponding entry is unspecified;

if so, in the first table, building a new entry for the subroutine, said building step comprising the steps of:
setting a first table first address of the new entry in the first table to the second table third address of the corresponding entry; and
setting a first table second address of the new entry in the first table to the return address of the associated subroutine.

6. The method of claim 5, further comprising the step of updating the in pointer of the second table to point to the new entry.

7. The method of claim 1, wherein the first table second address identifies the return address of each return for the corresponding subroutine, when the corresponding subroutine has more than one return.

8. The method of claim 1, wherein the second table first address identifies the return address of each return for the respective subroutine, when the respective subroutine has more than one return.

9. An apparatus for associating subroutine return branches with corresponding targets, comprising:
a first table for storing a plurality of entries for at least one subroutine that has been executed, wherein each entry in the first table comprises:
a first table first address identifying an entry point address for a corresponding subroutine and
a first table second address identifying a return address of a return for the corresponding subroutine;
a second table having an in pointer, wherein each entry in the second table comprises:
a second table first address identifying a return address of a return for a respective subroutine called by a corresponding subroutine call instruction,
a second table second address identifying a target address of the return for the respective subroutine, and
a second table third address identifying an entry point address for the respective subroutine.

10. The apparatus of claim 9, wherein the first table second address identifies the return address of each return for the corresponding subroutine, when the corresponding subroutine has more than one return.

11. The apparatus of claim 9, wherein the second table first address identifies the return address of each return for the respective subroutine, when the respective subroutine has more than one return.

12. A method for associating subroutine calls with corresponding targets, comprising the steps of:
maintaining a first table of entries, wherein each entry in the first table comprises:
a first table first address identifying an entry point address for a corresponding subroutine and
a first table second address identifying a return address of a return for the corresponding subroutine;
maintaining a second table of entries, wherein each entry in the second table comprises:
a second table first address identifying a return address of a return for a respective subroutine called by a corresponding subroutine call instruction,
a second table second address identifying a target address of the return for the respective subroutine, and
a second table third address identifying an entry point address for the respective subroutine, determining whether the second table stores an entry whose second table first address corresponds to a return address of a return for a considered subroutine;
if so, predicting a target address of the return for the considered subroutine to be the second table second address of the corresponding entry.

13. The method according to claim 12, further comprising the steps of:
upon generation of the target address for a subroutine call instruction associated with the considered subroutine and prior to said determining step, building a new entry in the second table for the subroutine call instruction and updating an in pointer of the second table to point to the new entry, said building step comprising the steps of:
setting a second table second address of the new entry to an address corresponding to a sum of the subroutine call instruction and one instruction; and
setting a second table third address of the new entry to the target address for the subroutine call instruction.

14. The method according to claim 13, wherein said building step further comprises the steps of:
determining whether the first table stores an entry whose first table first address matches the target address for the subroutine call instruction;
if so, setting a second table first address of the new entry to the first table second address of the matching entry.

15. The method of claim 13, further comprising the step of updating the in pointer of the second table to point to the new entry.

16. The method according to claim 13, further comprising the steps of:
upon generation of the target address of the return for the considered subroutine, determining whether the target address of the return for the associated subroutine is equal to the second table second address of the corresponding entry and whether the second table first address of the corresponding entry is unspecified;
if so, in the first table, building a new entry for the subroutine, said building step comprising the steps of:
setting a first table first address of the new entry in the first table to the second table third address of the corresponding entry; and
setting a first table second address of the new entry in the first table to the return address of the associated subroutine.

17. The method of claim 16, further comprising the step of updating the in pointer of the second table to point to the new entry.

18. The method of claim 12, wherein said step of determining whether the second table stores an entry whose second table first address corresponds to the return address for the considered subroutine is performed beginning at an entry immediately preceding an entry pointed to by the in pointer of the second table.

19. The method of claim 12, wherein the first table second address identifies the return address of each return for the corresponding subroutine, when the corresponding subroutine has more than one return.

20. The method of claim 12, wherein the second table first address identifies the return address of each return for the respective subroutine, when the respective subroutine has more than one return.

* * * * *